United States Patent [19]
Buzzelli

[11] 3,963,516
[45] June 15, 1976

[54] HIGH ENERGY DENSITY FUSED SALT BATTERY AND CATHODE FOR USE THEREIN

[75] Inventor: Edward S. Buzzelli, Export, Pa.

[73] Assignee: Westinghouse Electric Corporation, Pittsburgh, Pa.

[22] Filed: Feb. 26, 1974

[21] Appl. No.: 446,190

[52] U.S. Cl............................. 136/6 LF; 136/20; 136/100 R
[51] Int. Cl.².................................. H01M 35/02
[58] Field of Search........... 136/6 L, 6 R, 20, 83 R, 136/83 T, 100 R, 137, 120 R; 252/439, 62.3 R

[56] References Cited
UNITED STATES PATENTS

| | | |
|---|---|---|
| 3,423,242 | 1/1969 | Meyers et al..................... 136/6 Ln |
| 3,607,402 | 9/1971 | Buzzelli.............................. 136/6 LF |
| 3,726,716 | 4/1973 | Athearn et al.................. 136/100 R |
| 3,791,867 | 2/1974 | Broadhead et al.................... 136/20 |

Primary Examiner—Anthony Skapars
Attorney, Agent, or Firm—A. Mich, Jr.

[57] ABSTRACT

A composite cathode comprising an integral matrix of about 20 to 80% by weight current collector material which is electronic or semiconducting in nature, preferably carbon, and about 80 to 20% by weight metal sulfide, preferably antimony sulfide. The high energy density battery comprises said composite cathode in spaced apart relation to a LiAl alloy anode, and a molten LiCl—KCl electrolyte in contact with the cathode and anode.

6 Claims, 3 Drawing Figures

HIGH ENERGY DENSITY FUSED SALT BATTERY AND CATHODE FOR USE THEREIN

FIELD OF THE INVENTION

The present invention relates to a fused salt electrolytic cell, and in particular, to a molten LiCl—KCl high energy density battery and cathode for use therein.

BACKGROUND OF THE INVENTION

For several years there has existed a need for a high energy, high power density battery capable of performance at levels of 100 watt-hours per pound and 100 watts per pound. The need for this type of battery has become particularly acute in view of recent fuel shortages. Batteries of this level of performance are required for use in commuter-type automobile vehicles, storage of electrical energy generated during slack consumption periods for use during peak demand, and the like.

It has been known for some time that aqueous systems are not capable of the sustaining high voltages required for such application. Various nonaqueous, solvent systems were attempted, but found to have limited usefulness because of the limited drain rate capability of the call as well as impractical current density levels. These cells have provided energy densities of about 100 watt-hours per pound but only over very long discharge times resulting in poor power capabilities. The power capabilities averaged in the range of from 1 to 20 watts per pound.

Another approach which has been used is the fused salt battery. One such system utilizes a molten LiCl electrolyte in which externally stored chlorine gas is used for reaction with a molten lithium anode. This system has demonstrated very high discharge rates with little polarization losses. However, the system suffers both from a materials corrosion problem as a result of the very high temperatures required, and the need to carry an external source of chlorine gas.

A eutectic fused salt electrolyte of LiCl—KCl has been used with an aluminum-lithium alloy anode and a high surface area carbon cathode. This system has demonstrated relatively good performance, but has been limited by the inherent capacity of the carbon electrode. In particular, the capacity of the carbon cathode is based on its high surface area and its ability to store ions of the electrolyte. Typically, carbon electrodes have a capacity of about 100 to 150 watt-hours per pound. At least one attempt has been made to improve upon the cathode by utilizing elemental sulfur in combination with a porous carbon current collector.

By combining elemental sulfur with the carbon, the battery mechanism is achieved by the formation of lithium sulfide in the presence of elemental sulfur. This battery, however, suffers from a number of shortcomings. For example, the battery cannot be charged to high voltages without chlorine storage becoming significant. Furthermore, it has a high effective resistance, due to the presence of sulfur and lithium sulfide. The cathode itself, sulfur, is soluble in the electrolyte and vaporizes at temperatures above 440°C.

Accordingly, it is an object of the present invention to provide a high energy density fused salt battery that overcomes the disadvantages inherent in the prior art batteries. It is a further object of the present invention to provide a cathode for use in a molten salt battery having high energy storage with no degradation at high voltages, in the chlorine region.

SUMMARY OF THE INVENTION

The present invention provides a high energy density battery utilizing a molten LiCl—KCl electrolyte, a solid Li-Al alloy anode and a composite cathode comprising a metal sulfide in intimate contact with a current collector of electronic or semiconductive material. In particular, the present invention provides a high capacity composite cathode for use in molten LiCl—KCl at 450° comprising a high surface area current collector such as carbon, boron carbide, and the like in intimate contact with a reaction material selected from metal sulfides. Suitable metal sulfides for use in the present invention include tungsten disulfide, molybdenum disulfide, antimony sulfide, and the like. Preferably, the high energy density cathode comprises antimony sulfide ($Sb_2S_3$) in combination with a porous carbon current collector matrix. The preferred cathode is capable of a high energy density of at least 200 watt-hour/pound. When used in the molten LiCl—KCl electrolyte and solid Li-Al alloy anode of the present invention, a performance of 100 watt-hour/pound is achieved.

Other advantages of the present invention are apparent from a perusal of the following detailed description of the presently preferred embodiment of the invention taken in connection with the accompanying drawings.

PRESENTLY PREFERRED EMBODIMENT

Figure 1:
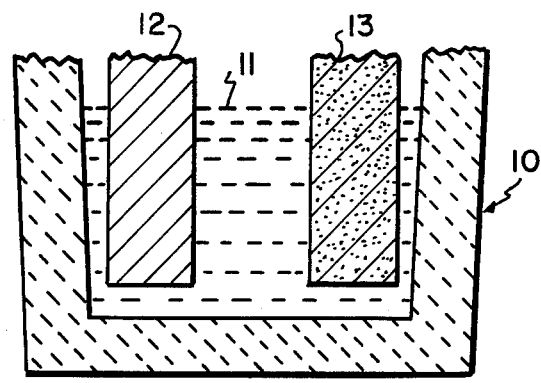
FIG. 1 is a sectional elevation of the battery pursuant to the present invention.

With reference to FIG. 1, high energy density cell 10 comprises a molten LiCl—KCl electrolyte 11 which is maintained at a temperature of about 450°C by resistance heaters (not shown). A solid Li-Al alloy anode 12 is provided which preferably comprises 45 at.% lithium and 55 at.% aluminum. Anode 12 is adapted for connection with an electrical circuit. Cell 10 includes high energy density cathode 13 comprising a metal sulfide integrally combined with a porous current collector comprising an electronic or semiconductive material, such as boron carbide. Preferably, the current collector material comprises a porous carbon matrix. Cathode 13 is adapted for connection to an electrical circuit through a graphite rod, not shown.

Cathode 13 of the present invention, preferably comprises about 50% by weight current collector material and 50% by weight metal sulfide. However, 20 to 80% by weight of current collector, preferably carbon and 80 to 20% by weight metal sulfide are suitable for use in the invention. By increasing the content of metal sulfide, the capacity of the battery may be increased.

Preferably, the metal sulfide utilized is antimony sulfide, because it has been found to produce a desirably high energy density of at least 200 watt-hour/pound. However, other metal sulfides such as tungsten disulfide, molybdenum disulfide, and the like are suitable for use in the present invention.

Cathode 13 is preferably fabricated by combining the metal sulfide, e.g. $Sb_2S_3$, with a carbonaceous binder such as a phenolic resin, coal tar pitch and the like.

Preferably, a phenolic resin is mixed in powder form with the selected metal sulfide. This composite is then molded at 90°C into the desired shape of the cathode. The resulting molded cathode is then baked in an inert atmosphere, typically argon, at a temperature of about 1000°C. Baking the molded cathode thermally reduces the resin binder to a high surface area, electrically conductive carbon with the metal sulfide, preferably $Sb_2S_3$, dispersed throughout the matrix in electrical contact with the carbon.

Alternatively, a porous current collector material can be impregnated with either molten antimony sulfide or vapor deposited with antimony sulfide. Yet another way of manufacturing the cathode comprises impregnating a porous current collector, e.g. carbon, with the desired metal, e.g. antimony, and thereafter exposing the impregnated structure to molten sulfur for activation.

In cell 10 of the present invention, wherein cathode 13 comprises a thermally reduced phenolic resin binder and antimony sulfide and is electrically connected to a circuit through, for example, a graphite rod (not shown), cathode 13 is electrically cycled in fused salt electrolyte 11 against the lithium-aluminum anode 12. Initially, this cycling conditions the cathode by introducing salt into the porous structure. By further cycling, compounds are formed with the ionic species present in the electrolyte. Thus, when electrode 13 is charged to a potential approaching the chlorine gassing potential, the surface of the electrode is covered with chlorine ions. In this state, the chlorine ions attract and/or partially react with the antimony sulfide in contact with the carbon. Upon discharge, these compounds are electro-chemically reduced at greater than 2.2 volts on the cell. As the discharge progresses, alkali ions are absorbed on the surface and are allowed to react with antimony sulfide to form a reaction capable of delivering energy as an electro-chemical system. The discharge is believed to proceed by increasing the concentration of alkali metal in the electrode. The source of the alkali metal is from Li-Al alloy anode 12 which is carried by means of the fused salt electrolyte 11. Upon charging the system, the reverse mechanism occurs. The alkali metal is removed to a potential of about 2.2 volts on the cell, thereafter, chloride ions will then react at the surface with both the carbon and the antimony sulfide up to 3.35 volts (otherwise gassing of chlorine would occur).

Figure 2:
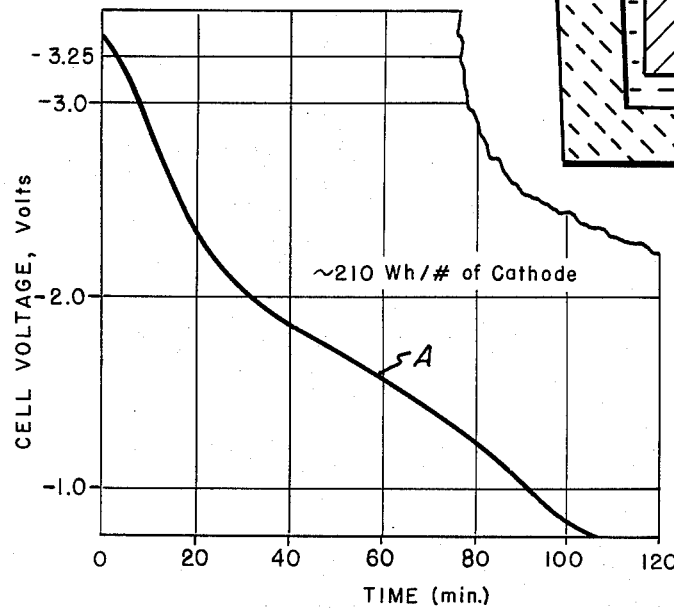
FIG. 2 is a graphical representation of the discharge of a composite $Sb_2S_3$/carbon cathode of the present invention showing the discharge rate as a function of cell voltage and time.

With reference to FIG. 2, the discharge of the carbon-$Sb_2S_3$ composite cathode is shown. The area under Curve A representing a 100 mA discharge rate, times the current used in discharge, is the number of watt hours stored by the cathode against Li-Al anode 12. Based upon the volume and density of the cathode, the energy storage per pound of cathode is calculated.

Thus, cathode 13 comprising 50% $Sb_2S_3$ and 50% phenolic resin, and weighing 0.636 grams after baking, in an electrolyte comprising LiCl-KCl at a temperature of 450°C against an Li-Al alloy anode, a capacity in excess of 210 watt-hours/pound can be achieved.

Figure 3:
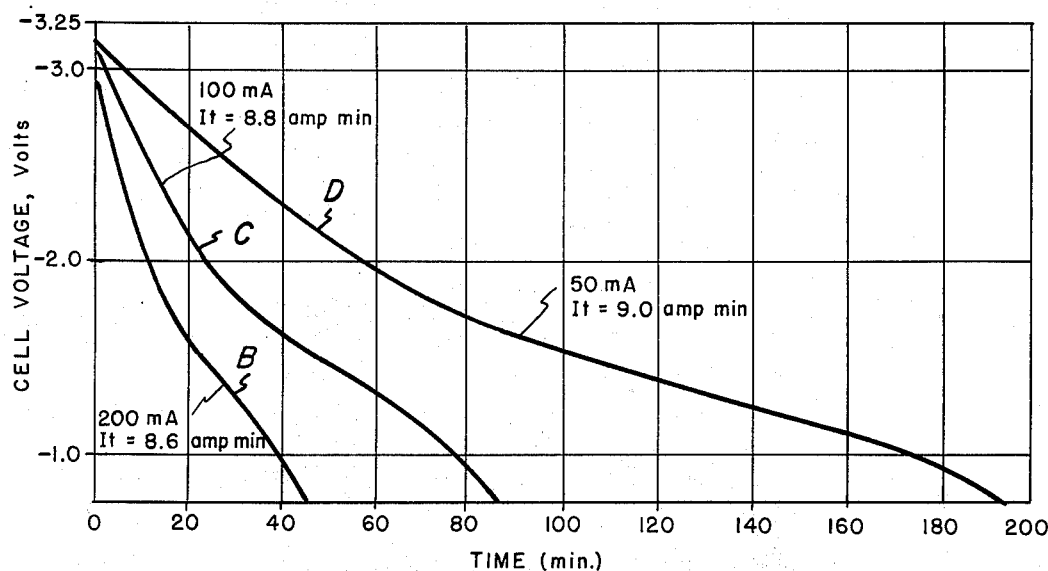
FIG. 3 is a discharge curve of the battery of the present invention at three different discharge rates.

With reference to FIG. 3, discharge Curves B (200 mA), C (100 mA) and D (50 mA) are shown for composite cathodes comprising 50% $Sb_2S_3$ and 50% phenolic resin in cell 10 having an electrolyte 11 of LiCl-KCl at 450°C against Li-Al anode 12 at the three different currents. From these curves it can be seen that there is little energy loss in capacity (amp.min.) at high discharge rates. It has also been found that the cathode can be rapidly recharged in about 5 minutes to nearly 100% of its capacity. Thus, the present invention provides a high energy density battery with rapid recharge capability.

While presently preferred embodiments of the invention have been described and shown in particularity, the invention may otherwise be embodied within the scope of the appended claims.

What is claimed is:

1. A fused electrolytic cell comprising a Li-Al anode, a cathode an integral matrix of about 20 to 80% by weight of a porous current collector material and about 80 to 20% by weight of a metal sulfide selected from the group consisting of antimony sulfide, tungsten disulfide and molybdenum disulfide spaced apart from said anode, and a molten LiCl—KCl electrolyte in contact with said anode and said cathode.

2. A fused electrolytic cell as set forth in claim 1 wherein said cathode comprises a matrix of about 50% by weight carbon and about 50% by weight of the metal sulfide.

3. A fused electrolytic cell as set forth in claim 1 wherein said cathode consists of a carbon current collector and antimony sulfide.

4. A battery comprising a fused salt electrolyte, an anode and cathode spaced apart from one another, both contacting the fused salt electrolyte, the cathode comprising about 20 to 80% by weight of a current carrying material and about 80 to 20% by weight of a metal sulfide selected from the group consisting of antimony sulfide, tungsten disulfide and molybdenum disulfide.

5. The battery of claim 4 wherein the anode comprises lithium, the fused salt comprises lithium chloride and the metal sulfide is antimony sulfide.

6. The battery of claim 4 wherein the anode is a lithium-aluminum alloy, the fused salt a eutectic of LiCl and KCl and the cathode comprising an integral porous matrix of about 20 to 80% of carbon and about 80 to 20% by weight of antimony sulfide.

* * * * *